Nov. 11, 1924.   
L. C. MILLER  
INSECT CATCHER  
Filed Dec. 16, 1922  
1,515,158
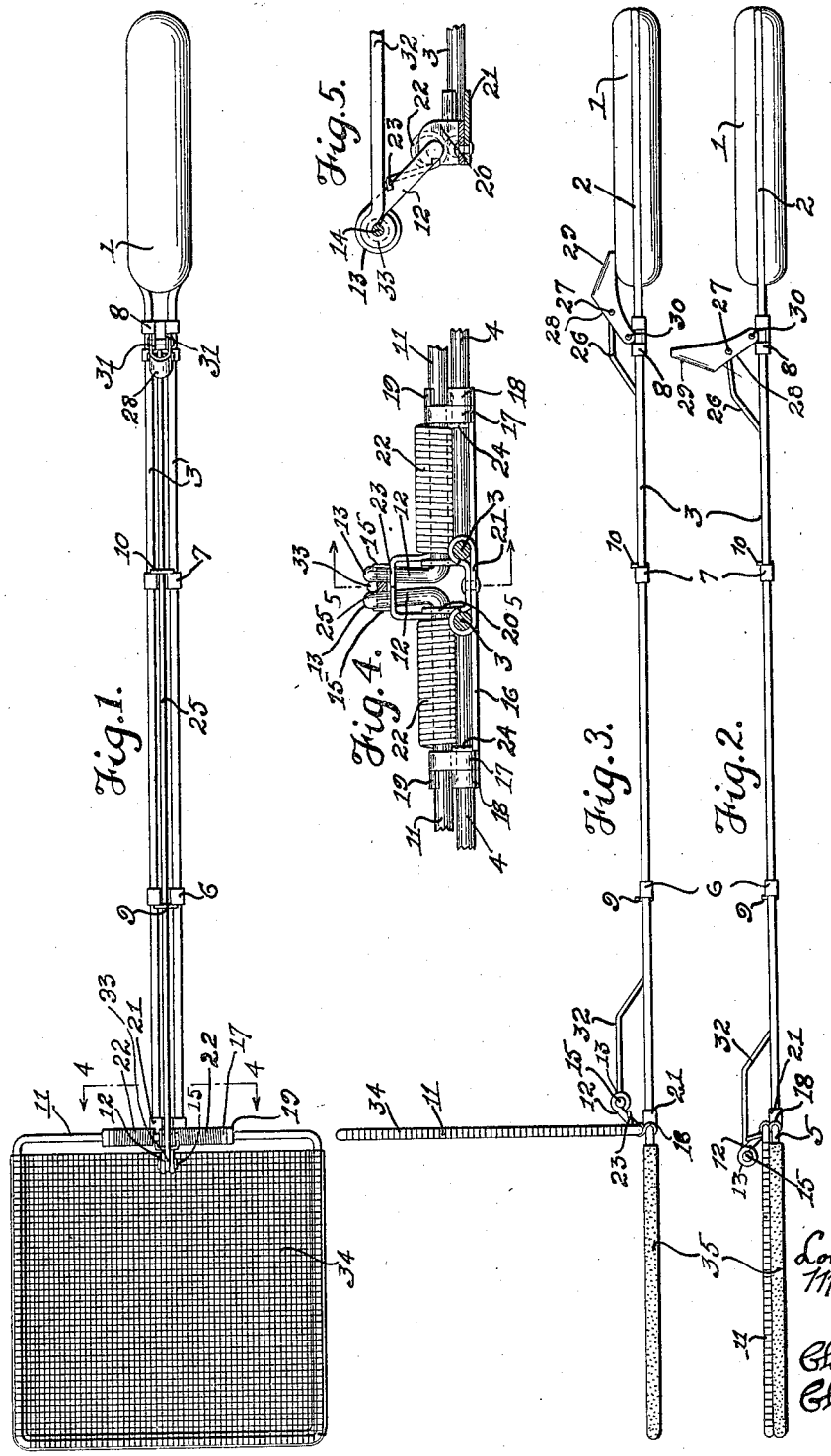

Patented Nov. 11, 1924.

1,515,158

UNITED STATES PATENT OFFICE.

LOUIS C. MILLER, OF VERONA, NEW JERSEY.

INSECT CATCHER.

Application filed December 16, 1922. Serial No. 607,362.

*To all whom it may concern:*

Be it known that I, LOUIS C. MILLER, a citizen of the United States, residing in Verona, county of Essex, and State of New Jersey, have invented a new and useful Improvement in Insect Catchers, of which the following is a description.

This invention has reference to devices for destroying pestiferous and other insects such as mosquitoes and flies, and particularly relates to a device by means of which such insects can be caught and killed, regardless of whether they are on the wing or have alighted upon the wall, ceiling, table, pendant, or other place.

Devices for killing flies and other insects have heretofore been produced, some of which have been given the name of "swatter." Traps have been made and used, into which the flies can crawl and from which they cannot find egress. Sticky substances such as adhesive fly paper and also poisonous baths have been employed calculated to kill the insects. Various other devices and expedients have been employed and suggested; but, all of them are objectionable for one reason or another. The "swatter" is objectionable for the reason that, when the insect is struck, it invariably smears, stains or soils the object on which the insect has alighted; and frequently, in swatting the insect, wall paper, ceiling or linen is badly soiled or some other object is knocked over and broken or interferes with the attack. "Swatters" cannot be used to catch the insect on the wing, but only to destroy the insect after it has alighted. Traps are objectionable because they are comparatively expensive, are not effective for the purpose, in that they catch only a small percentage of flies and never catch mosquitoes, and also because subsequently the trap has to be submerged in water in an attempt to drown the insects and thus destroy them after being caught. Sticky substances, such as the well-known fly paper, are objectionable because it is difficult to handle and must be laid in places where it frequently is brought into contact with children and household animals and not infrequently is engaged by garments worn by the person. The poisonous bath is highly objectionable because frequently the fly will drink the same and immediately fly away and fall dead into food and other things and places; and such baths are dangerous also to household animals and children. Both sticky and poisonous fly-papers are also objectionable because they are unsightly. To overcome all the foregoing objections, I have provided an insect catcher through the medium of which all insects, flies, mosquitoes, etc., can be caught on the wing or in flight, as well as after they have alighted, and instantly killed, thus avoiding smears on the wall, ceiling, linen, and enabling a room to be cleared out readily and effectively.

With the above objects in view and others which will be detailed during the course of this description, my invention consists in the parts, features, elements and combinations thereof hereinafter described and claimed.

In order that my invention may be clearly understood, I have provided drawings wherein:

Figure 1 is a top plan view of my insect catcher;

Figure 2 is a side elevation of the structure of Figure 1 showing the device closed;

Figure 3 is a view similar to Figure 1 showing the device open;

Figure 4 is a section, on an enlarged scale, taken on the line 4—4 of Figure 1, the arrows indicating the direction of sight; and Figure 5 is a section on the line 5—5 of Figure 4, the arrows indicating the direction of sight.

In the drawings I have illustrated a simple form of my invention which I have found in practice to be effective and sufficient, and therein the numeral 1 indicates the handle of the device, provided with a peripheral groove in which is laid a wire bent to conform to the shape of the handle, such bent portion being indicated at 2. The wire, after being bent and laid in the groove of the handle, is extended into two parallel bars 3, the said bars at their free ends being bent away from each other at a right-angle, as at 4, and then into rectangular form, thus producing a base or bottom frame 5 constituting the bottom wing of the device. The ends of the wire can be soldered together in any suitable manner, or the rectangular frame 5 can be first made, then the bars 3 produced, and then the free ends of the wires fitted into the groove of the handle, as at 2, and the ends soldered together or otherwise fastened, as may be found most convenient, economical and effective. The mode of making this portion of the device consisting of bottom frame, handle member and duplex connecting bar is immaterial from the standpoint of my invention, since the same can be made in various ways without departing from the spirit and essence of my invention. In order to strengthen the bars 3, and hold them properly in parallelism, I have provided bracing clips 6, 7 and 8 located at any desired point along the length of the bars 3 and adapted to hold the same in parallelism and rigidly together and also to form guiding, bracing and spacing devices 9 and 10, for the manipulation rod, as presently described. The swinging member or wing of my insect catcher consists of a rectangular frame 11 in shape identical with the rectangular bottom frame 5, the same having its free ends brought into close relationship at the point of bending the handle bars 3 from the rectangular frame 5, and then bent into upstanding arms 12, the free end of each of which is formed into an eye 13 through which is passed a headed pin or bar 14, the heads 15 of the pin holding the arms 12 from separation and so that they may work together under the influence of the manipulator and controlling spring.

For holding the frame members 5 and 11 together and enabling the one 11 to swing or journal upon the other 5, a bracket is provided consisting of a bar 16 provided at its opposite ends with upturned arms 17 which at their free ends are bent over the back bars of the top member 11. The bar 16 also has S-shaped arms 18 which are bent upwardly and over the top of the back bars 4 of frame 5 and between the same and the back bars of the frame 11 and over the top of said bars, as at 19, the two arms 17 and 18 thus providing a rigid connecting and sustaining means for the two frames 5 and 11 and providing journal bearings for the frame 11 upon the frame 5. To hold the arms 12 of the frame 11 in close relationship, the bar 16 has riveted thereto a U-shaped bracket with sustaining arms 20, through which the frame bars 11 are passed before the ends 12 are bent upwardly, said arms 20 also holding the arms 12 in proper relationship and likewise forming journal bearings for the frame 11. The bar 16 may also have struck up therefrom or secured thereto in any suitable way the brace 21, the free ends of which are looped and through which the bars 3 pass and by which they are held in proper relationship adjacent the point at which they are bent into the back bars 4 of the frame 5. Coiled springs 22 of considerable tension encircle the back bars of the frame 11 adjacent the arms 12, one end of each of which springs is angularly bent, as at 23, into engagement with the arms 12, so as to impose tension thereon and turn the frame member 11 into engagement with the frame member 5 and normally hold that position. The opposite end of each of the springs is bent, as at 24, into engagement with the adjacent bar 4 of the lower frame 5, so as to hold the spring from rotation and enable the same to impose its torsional tension upon the arms 12.

The top frame, or swinging member 11, is hinged on the bottom frame member 5 and is operated by the manipulator consisting of the rod 25 extended the major portion of its length between and parallel with the bars 3 and passed through the guides 9 and 10. At the handle end, the rod 25 is bent upwardly, as at 26, and has its free end encircling a pin 27 carried by a U-shaped thumb-piece 28, having an enlarged, rounded portion 29 on which the thumb is pressed and over which it is snapped in manipulating the member 11, as presently described. The thumb-piece has its ends journaled at 30 upon a pin or short bar which passes through upstanding ears 31 of the brace piece 8. Thus the thumb-piece 28 can be swung upon the pivot 30 and the bent end 26 of the rod 25 can play loosely on the pin 27, the thumb-piece thus drawing the rod toward the handle for the purpose of lifting the member 11 from the member 5, as clearly shown in Figure 3. The outer end of the rod 25 is upwardly and outwardly bent, as at 32, and at its extreme end encircles the pin or bar 14 between the arms 12, as shown at 33, Figures 1, 4 and 5.

Each of the frame members 5 and 11 is covered with fine wire mesh 34, which is wrapped around and secured to the bars of the frame members and stretched tightly across the latter, as shown in Figure 1. The frame members are of identical size and shape preferably, thus causing the member 11 to shut upon the member 5, the bars of one striking the bars of the other, thus preventing the wire mesh of either one from being distended or gradually broken down by the snapping of the frame 11 upon the frame 5. The bars of the frame 5 may be bound with a soft substance, such as felt or flannel, indicated at 35, the object of which is to prevent the bars of the frame member from scratching the wall, wall paper, the woodwork or any other substance or material it may come into contact with during the manipulation of the device. The top member 11 can be lifted from the bottom member 5 to the extent shown in Figure 3, viz, with the one member at substantially a right-angle to the other member, and when the member 11 is in this position the thumb-piece 28 will be in engagement, or substantially so, with the handle 1.

In order to operate or manipulate the catcher, the handle 1 is grasped and the thumb is applied to the thumb-piece 28, the parts normally being in the position of Figures 1 and 2. Pressure applied to the thumb-piece 28 will cause the rod 25 to move longitudinally toward the handle, thus lifting the top member 11 from the bottom member 5 against the tension of the springs 22. With the parts in the position substantially, as shown in Figure 3, though it has been found to be unnecessary to raise the top member 11 quite so far, the bottom member 5 can be quickly slid along the wall, ceiling or any other object on which the insect has alighted and very quickly shoved toward the insect, which will immediately take a flight, and as it flies upwardly the thumb is snapped off the thumb-piece 28, allowing the springs 22 to instantly and rapidly swing the top member 11 against the bottom member 5, and in so doing strike and force the insect against the bottom member 5 and thus kill it. This mode of operation can be carried on repeatedly and never fails; and one does not have to be an expert to accomplish the results, as it has been found that young children and women as well as men can almost instantly grasp the idea and can so manipulate the device as to not only catch the insects which have alighted upon wall, ceiling, chandelier, pendants or other places, but can literally catch them on the wing or in flight by quickly swinging the device and snapping the thumb from the thumb-piece as previously described.

Having thus described my invention, what I claim and desire to secure by Letters Patent is:

1. An insect catcher comprising two members of approximately equal dimensions and composed of wire mesh; a connecting bar rigidly secured to one of said members and having a handle at its free end; means for hinging one of said members to the other; and a spring controlled manipulator connecting one of the members with the said bar comprising a rod housed within the bar, a thumb-piece pivoted to the rod and also to the bar adjacent the handle, and adapted to be limited in its movement by said handle.

2. An insect catcher comprising a duplex bar formed of a single piece of wire which is also formed at one end into a rectangular member and at the other end into a handle loop; a corresponding rectangular member hinged to said first member; the two rectangular members being covered with wire mesh; a handle held in the loop of the bar; a spring-controlled manipulator for the second member pivotally connected thereto; a thumb-piece pivotally connected to the bar and to the manipulator and arranged adjacent the handle.

3. An insect catcher comprising a rectangular base member, a connecting bar and a handle formed of a single piece of wire; a top member formed of a single piece of wire and hinged to the base member; the two members being covered with wire mesh; a spring for normally holding the top member in contact with the base member; a rod pivotally connected to the top member, the rod being supported, guided and braced by the connecting bar; a thumb-piece pivotally mounted on the bar and loosely connected to the rod whereby pressure upon the thumb-piece will separate the top member from the base member against the action of the spring.

4. An insect catcher comprising a single piece of wire formed at one end into a rectangular member, and at the other end into a handle loop, and between the loop and member into parallel connecting bars; a corresponding rectangular member hinged to said first member; the two rectangular members being covered with wire; a spring-controlled manipulator for the second member pivotally connected thereto and extending between the connecting bars; means carried by the bars and cooperating with the manipulator for guiding and sustaining the latter; and means connected to the manipulator and arranged adjacent the handle loop for actuating the manipulator.

LOUIS C. MILLER.